US007555440B2

(12) United States Patent
Ingman

(10) Patent No.: US 7,555,440 B2
(45) Date of Patent: Jun. 30, 2009

(54) IMMEDIATE NEXT TASK DISPATCH SYSTEM AND METHOD

(75) Inventor: R. T. Mitchell Ingman, Peachtree, GA (US)

(73) Assignee: AT&T Intellectual Property I, L.P., Reno, NV (US)

(*) Notice: Subject to any disclaimer, the term of this patent is extended or adjusted under 35 U.S.C. 154(b) by 1170 days.

(21) Appl. No.: 10/134,871

(22) Filed: Apr. 29, 2002

(65) Prior Publication Data

US 2003/0204431 A1 Oct. 30, 2003

(51) Int. Cl.
*G06F 9/46* (2006.01)
(52) U.S. Cl. ........................................................ 705/8
(58) Field of Classification Search .................... 705/8, 705/9
See application file for complete search history.

(56) References Cited

U.S. PATENT DOCUMENTS

| | | | | | |
|---|---|---|---|---|---|
| 5,590,269 | A | * | 12/1996 | Kruse et al. | 705/9 |
| 5,615,121 | A | * | 3/1997 | Babayev et al. | 705/9 |
| 5,623,404 | A | * | 4/1997 | Collins et al. | 705/9 |
| 5,913,201 | A | * | 6/1999 | Kocur | 705/9 |
| 5,943,652 | A | * | 8/1999 | Sisley et al. | 705/9 |
| 5,963,911 | A | * | 10/1999 | Walker et al. | 705/7 |
| 6,278,978 | B1 | * | 8/2001 | Andre et al. | 705/9 |
| 6,370,231 | B1 | * | 4/2002 | Hice | 379/32.01 |
| 6,415,259 | B1 | * | 7/2002 | Wolfinger et al. | 705/8 |
| 6,578,005 | B1 | * | 6/2003 | Lesaint et al. | 705/8 |
| 7,283,971 | B1 | * | 10/2007 | Levine et al. | 705/9 |
| 2001/0037229 | A1 | * | 11/2001 | Jacobs et al. | 705/8 |
| 2001/0049619 | A1 | * | 12/2001 | Powell et al. | 705/9 |
| 2002/0065700 | A1 | * | 5/2002 | Powell et al. | 705/9 |
| 2003/0018509 | A1 | * | 1/2003 | Ossip et al. | 705/9 |
| 2003/0149598 | A1 | * | 8/2003 | Santoso et al. | 705/2 |
| 2005/0015504 | A1 | * | 1/2005 | Dorne et al. | 709/229 |
| 2007/0208604 | A1 | * | 9/2007 | Purohit et al. | 705/9 |

OTHER PUBLICATIONS

MDSI Mobile Data Solutions, www.mdsi-advantex.com, Dec. 5, 1998 [retrieved Apr. 11, 2005], pp. 1-31, retrieved from: Google.com and archive.org.*
Lesaint, D., C. Voudouris, and N. Azarmi. (2000). Dynamic Workforce Scheduling for British Telecommunications plc. Interfaces 30(1), 45-56.*
Lesaint, D., C. Voudouris, N. Azarmi, and B. Laithwaite. (1997). Dynamic Workforce Management. In Proceedings of the 1997 IEE Colloquium on AI for Network Management Systems, IEE Stevenage, UK, England, pp. 1/1-1/5.*
Lesaint, D., N. Azarmi, R. Laithwaite, and P. Walker. (1998). Engineering Dynamic Scheduler for Work Manager. BT Technology Journal 16(3), 16-29.*

(Continued)

*Primary Examiner*—Romain Jeanty
(74) *Attorney, Agent, or Firm*—Withers & Keys, LLC

(57) ABSTRACT

A task management system assigns a plurality of tasks to a plurality of workers. The assigned tasks are dispatched according to dispatch orders. The task management system may designate a task as an immediate next task. The immediate next task is prioritized first in a dispatch order, and is thus the first task to be dispatched to a worker, or the next task to be dispatched to the worker if a task is currently dispatched to the worker.

51 Claims, 10 Drawing Sheets

OTHER PUBLICATIONS

Lesaint, D., Voudouris, C., Azarmi, N., Alletson, I. and Laithwaite, B. (2003). Field workforce scheduling. In BT Technology Journal, 21, Kluwer Academic Publishers, pp. 23-26.*

Software Systems for Telecommunications, Science and Technology Series, Bell Communications Research, Oct. 1992, [retrieved from application file U.S. Appl. No. 08/608,838], pp. 34, 35, 53, 54, 58, 82, 83, 87, 93, 99, 100, 111-114, 139, 145, 146, 152, 153, 164.*

Rey, R.F., Engineering and Operations in the Bell System, AT&T Bell Laboratories, Murray Hill, NJ, 1984, pp. 605-621.*

Garwood G J: 'Work Manager', BT Technol J, 15, No. 1, pp. 58-68 (1997).*

Collins, J.E.; Sisley, E.M., "Automated assignment and scheduling of service personnel," IEEE Expert, vol. 9, No. 2, pp. 33-39, Apr. 1994.*

Guido, B.; Roberto, G.; Di Tria, P.; Bisio, R., "Workforce management (WFM) issues," Network Operations and Management Symposium, 1998. NOMS 98., IEEE, vol. 2, no., pp. 473-482 vol. 2, 15-20.*

* cited by examiner

IMMEDIATE NEXT TASK DISPATCH SYSTEM AND METHOD

BACKGROUND

1. Field of the Invention

The invention relates to automated dispatch systems, and more particularly to an immediate next task dispatch system and method.

2. Description of the Related Art

An automated dispatch system assigns a plurality of tasks to a plurality of workers working for a service provider. Each task is associated with a set of task parameters, such as task location, technical requirements, duration, etc. Likewise, each worker is associated with a set of worker parameters, such as known skills, work schedule, work area, etc. The automated dispatch system receives the task parameters and worker parameters and uses matching and minimization algorithms to create a task list for each worker. Each task list associates a set of tasks to a worker according to a dispatch priority, and the tasks are dispatched to the worker according to the dispatch priority. The system periodically generates new task lists during the work day to account for dynamics such as the worker completing dispatched tasks, new tasks, and so on. As a result of these dynamic loads, a worker's task list may change periodically throughout the day.

The service provider may desire that a particular task be an immediate next task dispatched to the worker. However, manually assigning a particular task to the worker in an automated dispatch system does not always ensure that the particular task will be the immediate next task dispatched to the worker, as the automated dispatch system may still insert other tasks before the manually assigned task based on task priority, minimization criteria, and other factors. Furthermore, when a service provider manually assigns more than one task to a worker, the system cannot ensure that any one manually assigned task will be the immediate next task assigned.

SUMMARY

According to the invention, a task management system for assigning a plurality of tasks to a plurality of workers is provided. The task management system includes a database and a management module. The database stores task records and worker records. Each task record corresponds to a task and includes task parameters, and each worker record corresponds to a worker and includes worker parameters. The management module is operable to access the database and compare the task records to the worker records and create a set of assigned tasks for each worker. Each set of assigned tasks is prioritized according to a corresponding dispatch order and dispatched to the worker based on the corresponding dispatch order. The management module is further operable to receive an immediate next task request for a requested task and a requested worker. If no other task is designated an immediate next task for the requested worker, the management module designates the requested task as an immediate next task for the requested worker and prioritizes the immediate next task first in the corresponding dispatch order of the set assigned tasks to the requested worker.

Also according to the invention, a computer implemented method of assigning a plurality of tasks to a plurality of workers is provided. The method includes the step of storing in a database task parameters for each task and worker parameters for each worker. Comparing the task parameters to the worker parameters creates a set of assigned tasks to a worker. A corresponding dispatch order for each set of assigned tasks is determined, and the assigned tasks are dispatched to the worker based on the corresponding dispatch order. Upon receiving an immediate next task request for a task, the task is designated an immediate next task for a worker if another task is not designated an immediate next task for the worker. The immediate next task is prioritized first in the corresponding dispatch order of the set of assigned tasks to the worker.

Also according to the invention, a task management system for assigning a plurality of tasks to a plurality of workers includes a database and a management module. The database stores task records and worker records. Each task record corresponds to a task and includes task parameters, and each worker record corresponds to a worker and includes worker parameters. The management module is operable to access the database and compare the task records to the worker records and create a set of assigned tasks for each worker. Each set of assigned tasks is prioritized according to a corresponding dispatch order and dispatched to the worker based on the corresponding dispatch order. The management module is further operable to receive an immediate next task request for a requested task and a requested worker. If no other task is designated as an immediate next task for the requested worker, the management module designates the requested task as an immediate next task for the requested worker and sets the corresponding dispatch order of the set of assigned tasks to the requested worker subordinate to dispatch of the immediate next task.

Also according to the invention, a task management system for assigning a plurality of tasks to a plurality of workers comprises a database and a management module. The database stores task records and worker records. Each task record corresponds to a task and includes task parameters, and each worker record corresponds to a worker and includes worker parameters. The management module is operable to access the database and compare the task records to the worker records to create a set of assigned tasks for each worker. Each set of assigned task is prioritized according to a corresponding dispatch order, and the management module dispatches the sets of assigned tasks to the workers based on the corresponding dispatch orders. The management module is further operable to receive an immediate next task request for a task and identify workers qualified to be designated the task as an immediate next task. The management module designates the task as an immediate next task for an identified worker and prioritizes the immediate next task first in the corresponding dispatch order of the set of assigned tasks to the identified worker.

DETAILED DESCRIPTION

Figure 1:
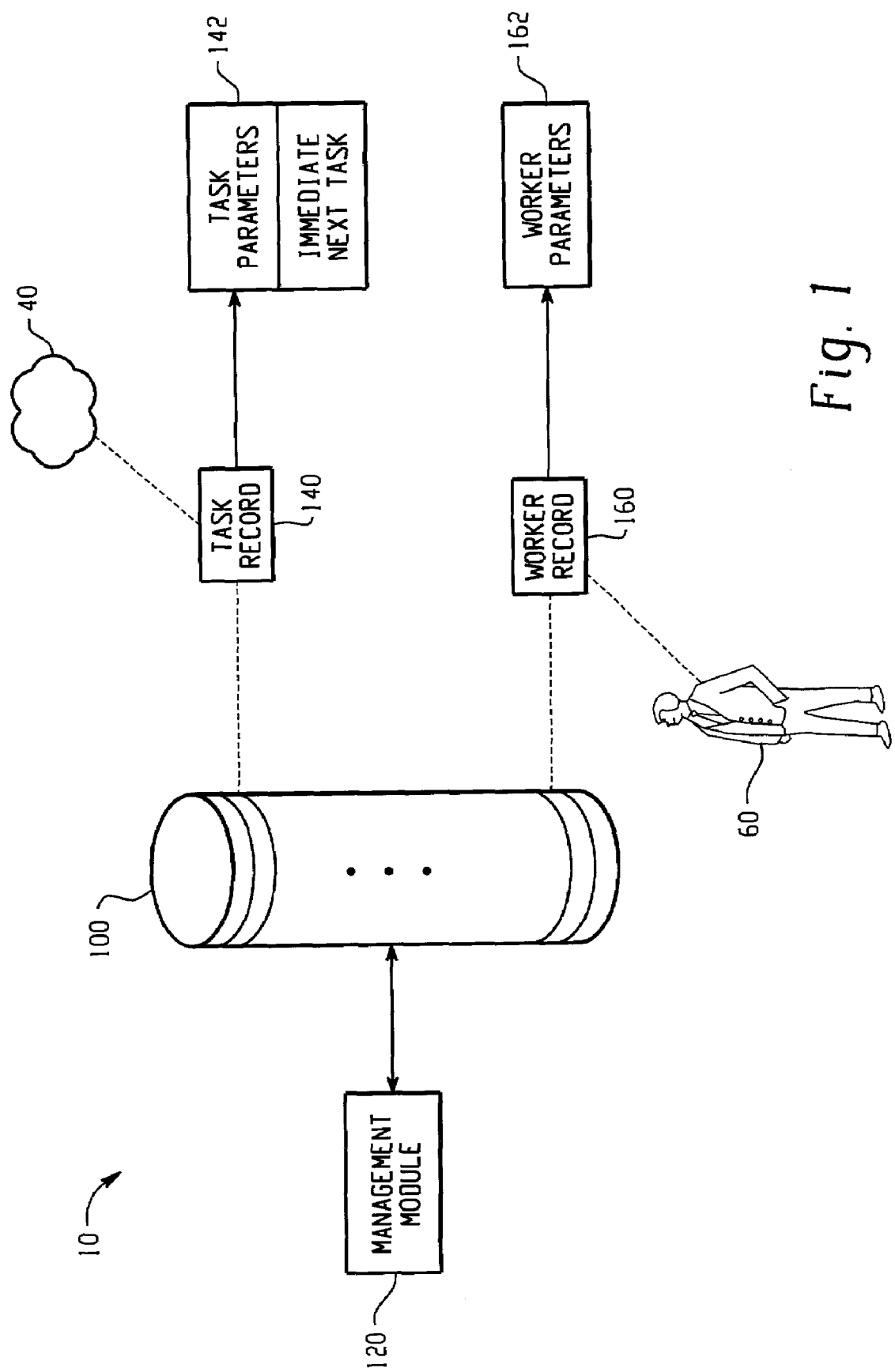
FIG. 1 is a block diagram of a task management system.

FIG. 1 shows a task management system 10 for assigning a plurality of tasks 40 to a plurality of workers 60 in accordance with the present invention. The task management system 10 includes a database 100 and a management module 120. The database 100 stores task records 140. Each task record 140 corresponds to a task 40 and includes task parameters 142. The task parameters 142 of a task record 140 store information related to the corresponding task 40.

The database 100 also stores worker records 160. Each worker record 160 corresponds to a worker 60 and includes worker parameters 162. The worker parameters 162 of a worker record 160 store information related to a corresponding worker 60.

The management module 120 is operable to access the database 100 and compare the task records 140 to the worker records 160 to create a set of assigned tasks 40 for each worker 60 and prioritize the assigned tasks 40 according to a corresponding dispatch order. The management module 120 then dispatches the assigned tasks 40 to the workers 60 based on the corresponding dispatch order. Additionally, the management module 120 can receive an immediate next task request for a task 40 and a worker 60, and will designate the task 40 as an immediate next task for the worker 60 if no other task 40 is designated as an immediate next task for the worker 60. The immediate next task 40 is then prioritized so that it is first in the dispatch order. Accordingly, the system 10 ensures that the immediate next task 40 is next to be dispatched to the worker 60.

In another embodiment, the management module 120 can receive an immediate next task request for a task 40 and a worker 60, and will designate the task 40 as an immediate next task for the worker 60 if no other task 40 is designated as an immediate next task for the worker 60. The management module 120 then sets the dispatch order of the assigned tasks 40 subordinate to dispatch of the immediate next task. Accordingly, the system 10 ensures that the immediate next task 40 is next to be dispatched to the worker 60.

In yet another embodiment, the management module 120 is further operable to receive an immediate next task request for a task 40 and identify workers 60 qualified to be designated the task 40 as an immediate next task. The management module 120 then designates the task 40 as an immediate next task 40 to an identified worker 60 and prioritizes the immediate next task 40 first in the dispatch order of the set of assigned tasks to the identified worker 60.

Figure 2:
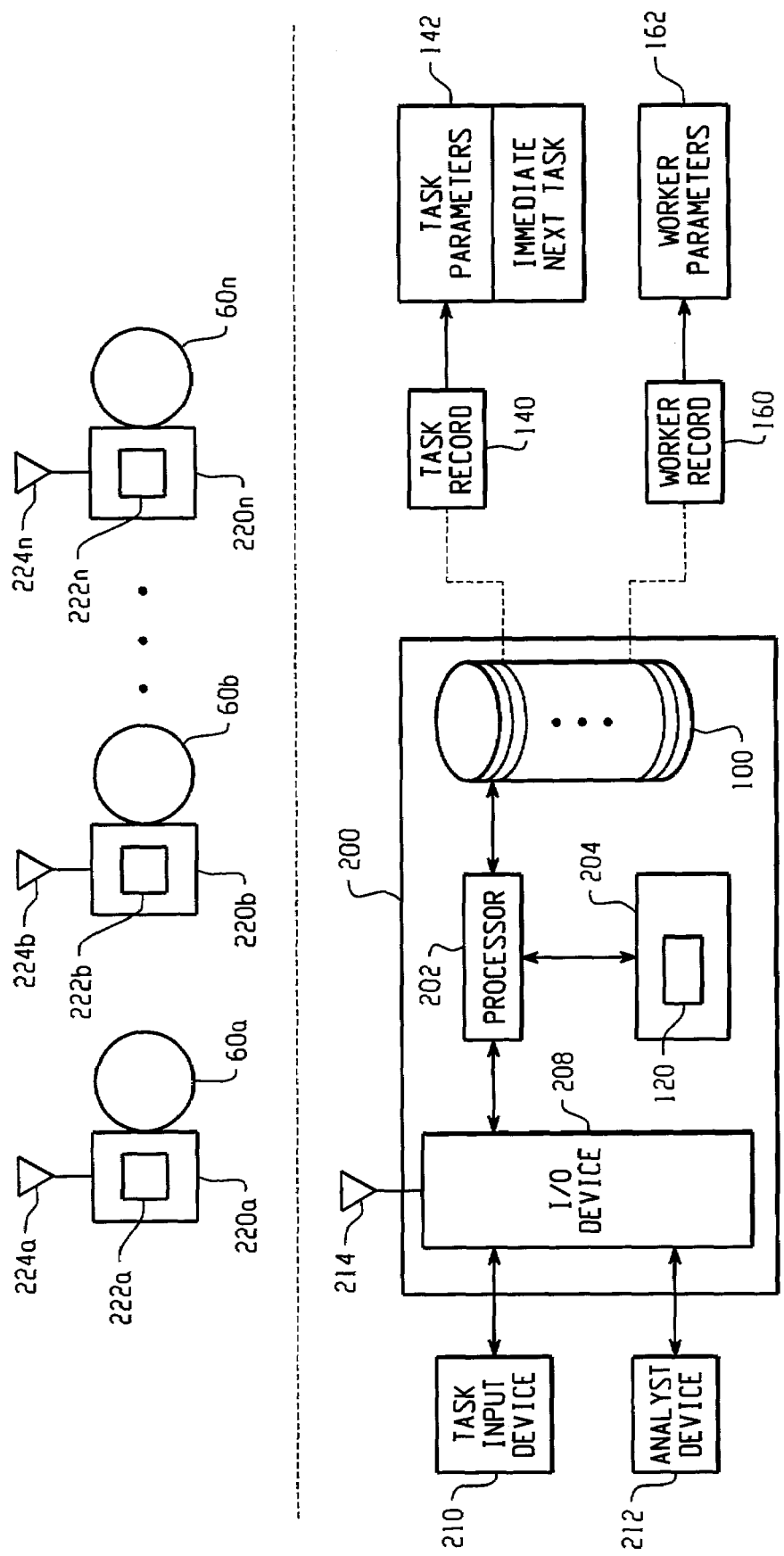
FIG. 2 is a block diagram of an exemplary operating environment of the task management system.

FIG. 2 provides an exemplary operating environment for the task management system 10. An automated dispatch computer 200 includes a processing unit 202 coupled to a computer memory 204 storing the management module 120. The management module 120 preferably comprises executable computer programs. The programs are operable to generate a set of tasks 40 for each worker 60 based on minimization and matching algorithms known to those of ordinary skill in the art of automated task management systems, determine a corresponding dispatch order for each set of tasks 40, and process immediate next task related requests and designations.

The processing unit 202 preferably executes the management module 120 and accesses the database 100. The task records 140 and the worker records 160 are compared according to the minimization and matching algorithms to generate a set of assigned tasks 40 for each worker 60 according to the corresponding dispatch order.

The processing unit 202 is coupled to an input/output device 208, through which a task input device 210 inputs new tasks 40 into the database 100. An analyst device 212, coupled to the processing unit 202 through the input/output device 208, is used to view and modify task lists. The task input device 210 and analyst device 212 may be realized through one common device, or may be realized through separate devices. The input/output device 208 is also connected to a dispatch transceiver 214 to transmit and receive information. The dispatch transceiver 214 transmits data related to a task 40 dispatched by the management module 120.

Each worker 60 is assigned a communication device 220 comprising an input/output device 222 and a communication device transceiver 224. Each communication device 220 is operable to transmit information to and receive information from the management module 120 via the communication device transceiver 224 and the dispatch transceiver 214.

The communication device transceiver 224 is operable to receive the task 40 dispatched by the management module 120. The input/output device 222 is operable to display the dispatched task to the worker 60, and the worker 60 may accept or reject the dispatched task 40.

However, if the task 40 dispatched by the management module 120 is an immediate next task, the communication device 220 may be operable to automatically accept the dispatched task 40. Thus, a worker 60 cannot reject a dispatched immediate next task 40. Alternatively, the first communication device 220 may be operable to conspicuously display the dispatched immediate next task 40. Thus, the worker 60 will be made aware of the immediate next task 40.

Workers 60 also use the communication device 220 to notify the automated dispatch computer 200 of the completion or suspension of a dispatched task 40. The management module 120 may then dispatch another task 40 to the worker 60.

Figure 3:
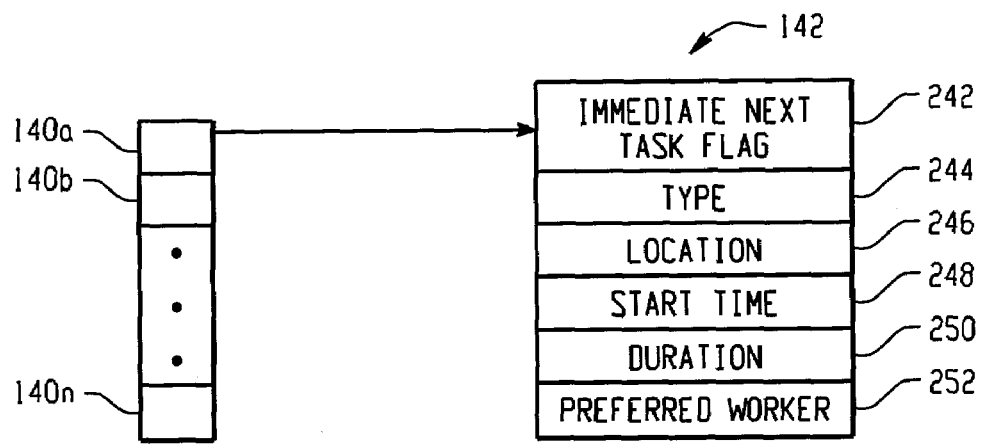
FIG. 3 illustrates the association of task parameters with each task of a plurality of tasks.

FIG. 3 illustrates the association of the task parameters 142 with each task record 140. The task record 140 illustratively includes an immediate next task flag field 242, a type field 244, location field 246, a start time field 248, a duration field 250, and a preferred worker field 252. The immediate next task flag field 242 identifies whether a task 40 corresponding to the task record 140 is designated an immediate next task 40. The type field 244 identifies the task type of task 40, e.g., residential repair, residential installation, commercial repair, etc. The location field 246 stores the location or address of the task 40. The start time field 248 stores the estimated start time of the task 40 as determined by the automated dispatch computer 200. The duration field 250 stores an estimated duration to complete the task 40 once the task 40 is dispatched. The preferred worker field 252 indicates whether the task 40 has been specified as preferred and the preferred worker 60.

Figure 4:
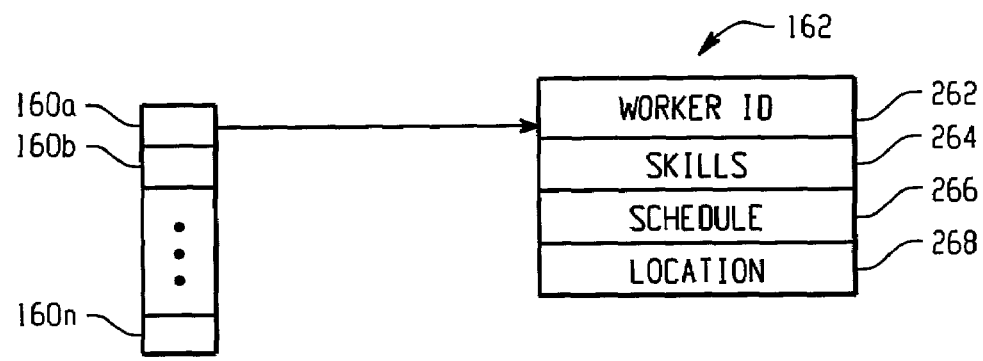
FIG. 4 illustrates the association of worker parameters with each worker of a plurality of workers.

FIG. 4 illustrates the association of the worker parameters 162 with each worker record 160. The worker record 160 includes a worker ID field 262, a skills field 264, a schedule field 266, and a location field 268. The worker ID field 262 contains identification information for an associated worker 60, e.g. an employee work number. The skills field 264 associates the worker 60 with a qualified set of skills, e.g., residential installation, commercial installation, residential repair, etc. The schedule field 266 contains schedule information for the associated worker 60, e.g., the work shift of the worker 60, lunchtime, whether the worker 60 is absent due to vacation or illness, etc. The location field 268 stores the current location of the worker 60. Thus, when a worker 60 is working on a dispatched task 40, the location field 268 of the worker record 160 will store the same location as location field 246 of the task record 140.

Figure 5:
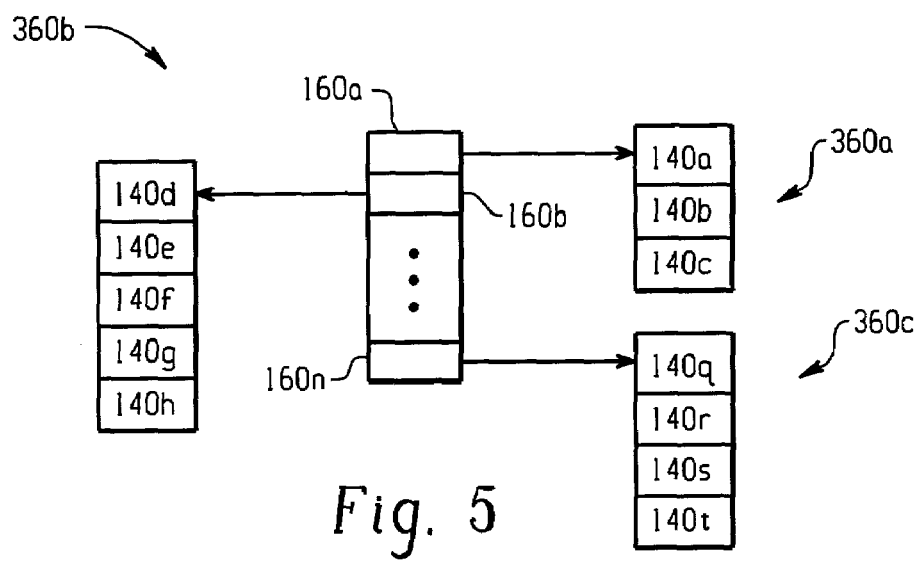
FIG. 5 illustrates the association of a task list with each worker.

As shown in FIG. 5, a task list 360 is associated with each worker 60. Each task list 360 represents a set of assigned tasks 40 for each worker 60 prioritized according to a dispatch order. Each task list 360 comprises a list of task records 140 associated with a worker record 160. The management module 120 accesses the database 100 and compares the task records 140 to the worker records 160 to create the task lists 360. The management module 120 also prioritizes the task records 140 in each task list 360 according to a corresponding dispatch order.

The management module 120 dispatches the assigned tasks 40 to the workers 60 based on the dispatch order. Either the first or second task record 140 in a task list 360 is first in the dispatch order, depending on whether the first task 40 corresponding to the first task record 140 has been dispatched. For example, the worker record 160*a* corresponds to a worker 60*a*. Prior to the beginning of the worker's 60*a* shift, no tasks 40 have been dispatched. Thus, task 40*a* is first in the dispatch order, because the first task record 140*a* in the task list 360*a* corresponds to the first task 40*a* to be dispatched to the worker 60*a*.

The task 40*a* is dispatched to the worker 60*a* at the beginning of the shift. Accordingly, task 40*b*, which corresponds to the record 140*b* in the task list 360*a*, is now first in the dispatch order, as it is the next task 40 to be dispatched. Upon completing the dispatched task 40*a*, the worker 60*a* notifies the management module 120 that the dispatched task 40*a* has been completed, and the management module 120 dispatches task 40*b*, the next task 40 in the dispatch order. After task 40*b* is dispatched, task 40*c* is prioritized first in the dispatch order. The corresponding record 140*a* may then be removed from the task list 360*a*.

The task list 360 for each worker 60 is created each day during an initial load and updated several times a day during dynamic loads. Prior to the beginning of the day, or during the day, a service provider may desire that a particular task 40 be the next task dispatched to a worker 60. However, because the management module 120 assigns tasks 40 to workers 60 according to minimization and matching algorithms to achieve an optimal or near-optimal distribution of the tasks 40 among the workers 60, it is unlikely that the particular task 40 will be the next task dispatched to a worker 60. Accordingly, the management module 120 is operable to designating a task as an immediate next task 40 and prioritize the immediate next task 40 first in the dispatch order of the task list 360.

Figure 6:
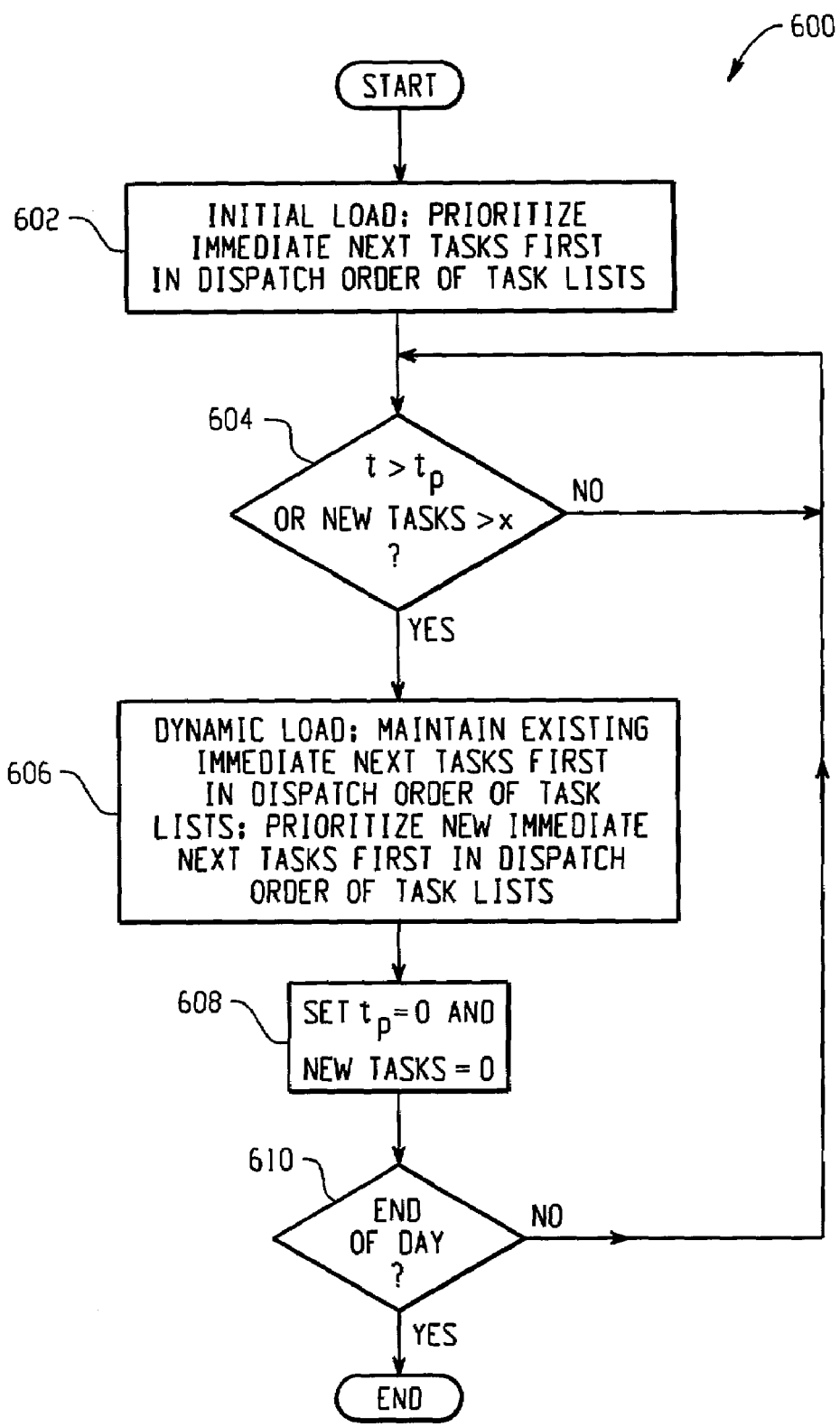
FIG. 6 is a flow diagram illustrating an initial load and dynamic load of the task lists.

FIG. 6 provides a flow diagram 600 that illustrates an overview of the initial and dynamic loads. In step 602, an initial load generates a set of task lists 360, each task list being associated with a worker 60 scheduled to work that day. The management module 120 inputs the task parameters 142 stored in task records 140 and worker parameters 162 in worker records 160 into a set of matching and minimization algorithms to create the task lists 360 for each worker 60. During the initial load, each task record 140 is checked to determine whether its immediate next task flag 242 is set. If the immediate next task flag 242 of a task record 140 is set, the task record 140 is prioritized first in a dispatch order of a task list 360 for a worker 60. Accordingly, when the worker 60 arrives at work for the day, the immediate next task 40 will be the first task 40 dispatched to the worker 60.

The task lists 360 are modified by workers 60 completing their assigned tasks 40, by adding new tasks 40 to the existing tasks, and by the workers 60 being removed from availability due to the completion of a work shift, illness, etc. To account for these dynamics, the management module 120 periodically generates and loads new task lists 60 during the workday. These dynamic loads are conducted after a specified period of time has elapsed, or after the number of new tasks 40 input into the automated dispatch computer 200 exceeds a threshold value. As a result of these dynamic loads, the task lists 360 may change periodically throughout the day.

Thus, in step 604, the system 10 determines if the time since the initial load or last dynamic load has exceeded a specified period of time $t_p$ or if the number of new tasks 40 input into the automated dispatch computer 200 has exceeded a threshold value x. If either condition is true, then the management module 120 conducts a dynamic load in step 606. During the dynamic load, immediate next tasks 40 in the task lists 360 are maintained first in the corresponding dispatch orders and the remaining tasks 40 in the task lists are subject to the dynamic load. Thus, the immediate next tasks 40 in the task lists 60 are unaffected by the dynamic load, while the remaining tasks 40 may be changed. Furthermore, new immediate next tasks 40 that have been added since the last dynamic load are prioritized first in the dispatch order of task lists 360.

Once the dynamic load is completed, the management module resets $t_p$ and x to 0, as shown in step 608. In step 610, the system 10 determines whether the end of a workday has been reached; if so, the process ends; if not, the system 10 continues to monitor threshold variables $t_p$ and x in step 604.

Figure 7:
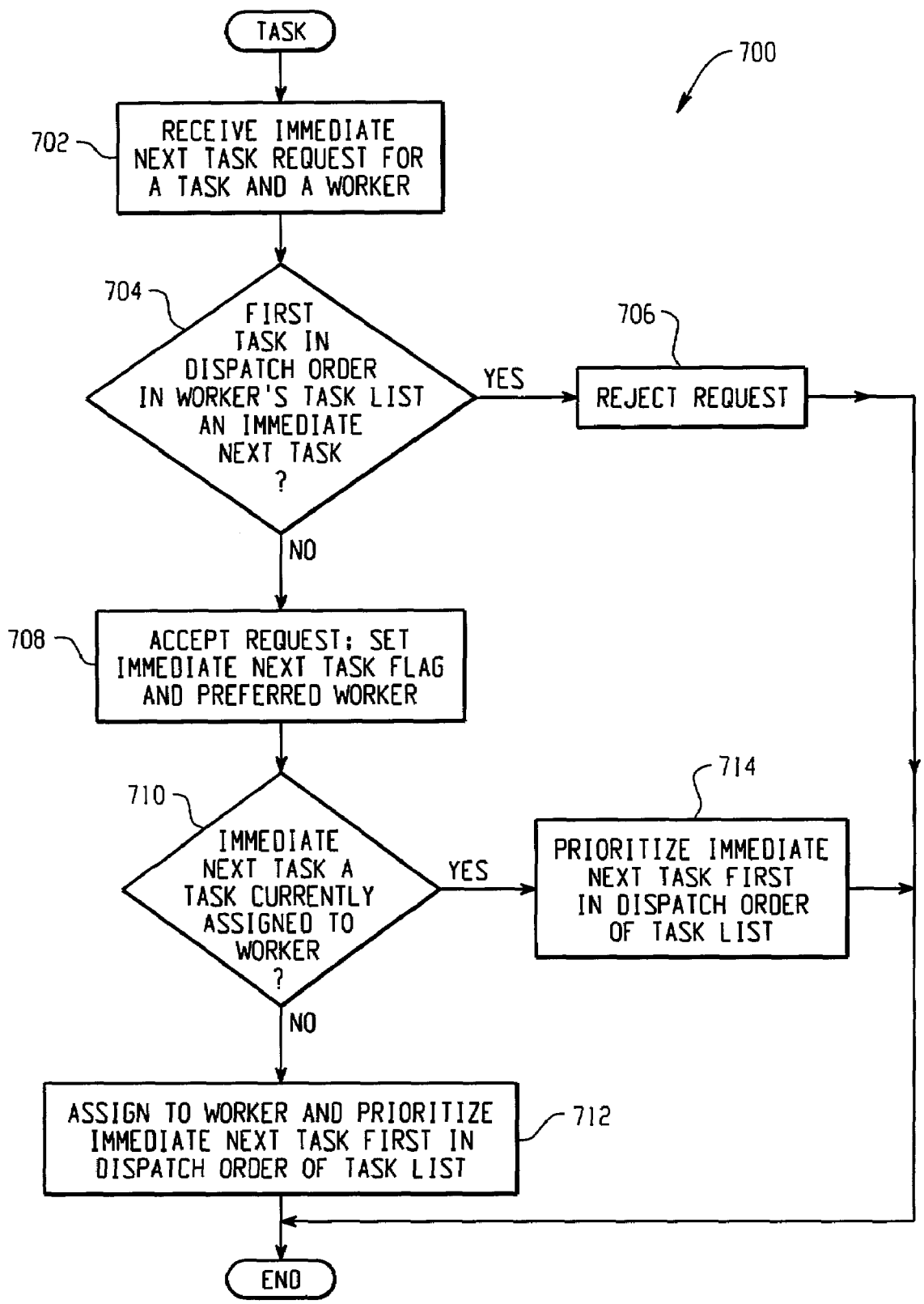
FIG. 7 is a flow diagram illustrating a method of processing an immediate next task request.

A task 40 may be designated an immediate next task upon acceptance of an immediate next task request. FIG. 7 provides a flow diagram 700 that illustrates a method of processing an immediate next task request. In step 702, the system 10 receives an immediate next task request. Illustratively, the immediate next task request is received by the automated dispatch computer 200 from the analyst device 212. The immediate next task request specifies a task 40 and may also specify a worker 60 to receive the task 40.

In step 704, the system 10 determines if the first task 40 in the dispatch order of the worker's task list 360 has been designated an immediate next task by interrogating the immediate next task flag field 242 of task record 140 that is first in the dispatch order of the worker's task list 360.

If the first task 40 in the dispatch order in the worker's 60 task list 360 is designated an immediate next task 40, the automated dispatch computer 200 rejects the request in step 706. Since a task 40 that is designated an immediate next task is first in the dispatch order of a task list 360, two tasks 40 in a task list 360 cannot be designated an immediate next task. The service provider is notified that the immediate next task request has been rejected so that another worker 60 may be identified that can respond to the immediate next task request.

However, if the first task 40 in the dispatch order of the worker's 60 task list 360 is not an immediate next task, the system 10 accepts the request in step 708 and designates the task 40 as an immediate next task 40 for the worker 60. The immediate next task flag field 242 of the corresponding task record 140 is set, and information is stored in preferred worker field 252 of the corresponding task record 140 to identify the preferred worker 60 for the immediate next task 40.

In step 710, the system 10 determines if the immediate next task 40 is a task currently assigned to the worker 60. A task 40 is currently assigned to the worker 60 if the corresponding task record 140 is currently in the worker's 60 task list 360. If the immediate next task 40 is not currently assigned to the worker 60, the immediate next task 40 is assigned to the worker (i.e., the corresponding task record 140 is included in the worker's 60 task list 360), and the immediate next task 40 is prioritized first in the dispatch order, as shown in step 712. If the immediate next task 40 is currently assigned to the worker 60, it is prioritized first in the dispatch order, as shown in step 714.

In another embodiment of the invention, the dispatch order of the task list 360 is subordinate to the dispatch of an immediate next task 40. The task list 360 does not include the immediate next task 40 in the worker's 60 task list 360. Rather, the immediate next task 40 is only prioritized first in the dispatch order of the task list 360. The task list 360 otherwise remains unchanged.

Figure 8:
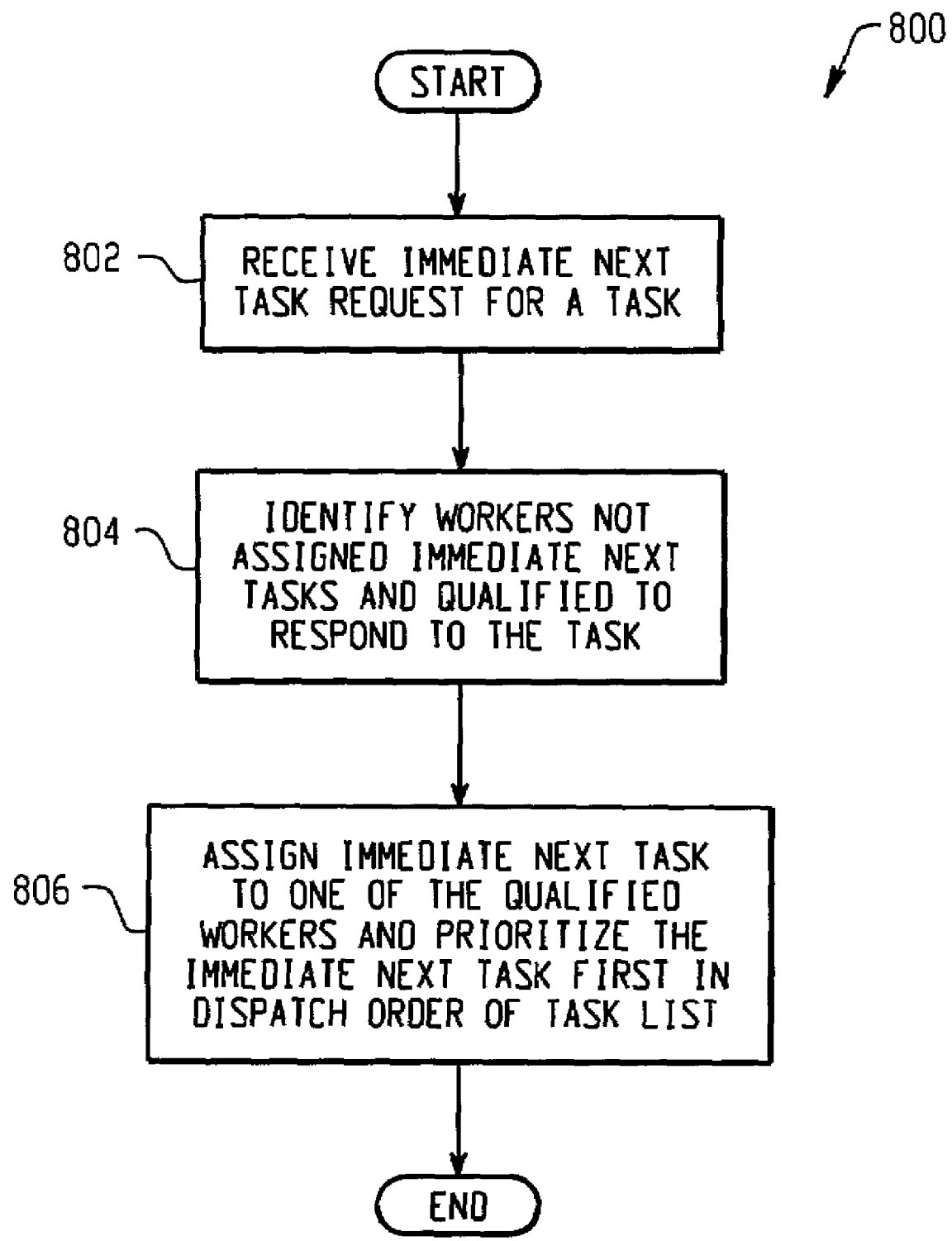
FIG. 8 is a flow diagram illustrating another method of processing an immediate next task request.

FIG. 8 provides a flow diagram 800 that illustrates another immediate next task request process. In this exemplary process, the immediate next task request does not specify a worker 60. Workers 60 that are not assigned immediate next tasks 40 are identified as eligible respondents to the immediate next task request.

In step 802, the system 10 receives an immediate next task request for a task 40. In step 804, the system identifies workers that are not assigned immediate next tasks, and who are qualified to respond to the task 40. The system 10 determines whether a worker 60 is qualified to respond to the task 40 by comparing the task parameters 142 to the worker parameters 162 for each identified worker. In step 806, the immediate next task is assigned on one of the qualified workers 60. The assignment may be made automatically by the system 10, or may be manually specified by the service provider. The immediate next task 40 is then prioritized first in the dispatch order of the worker's 60 task list 360.

In another embodiment, the system 10 assigns only one immediate next task 40 to a worker 60 during a shift. Thus, the worker 60 may receive no more than one immediate next task 40 per workday.

An immediate next task 40 assigned to a first worker 60 may be reassigned to a second worker 60. Using the analyst device 212, the service provider may access the work lists 360 and manually reassign an immediate next task 40. The service provider is provided a warning that the task 40 being reassigned is designated an immediate next task and is requested to confirm the reassignment. If the immediate next task 40 is reassigned, it is designated an immediate next task for the second worker 60 and assigned to the second worker 60. The second worker 60 is then specified as the preferred worker 60.

Alternatively, upon reassignment the immediate next task 40 may lose its status of an immediate next task and be reassigned as a normal task 40 to the second worker.

Figure 9A:
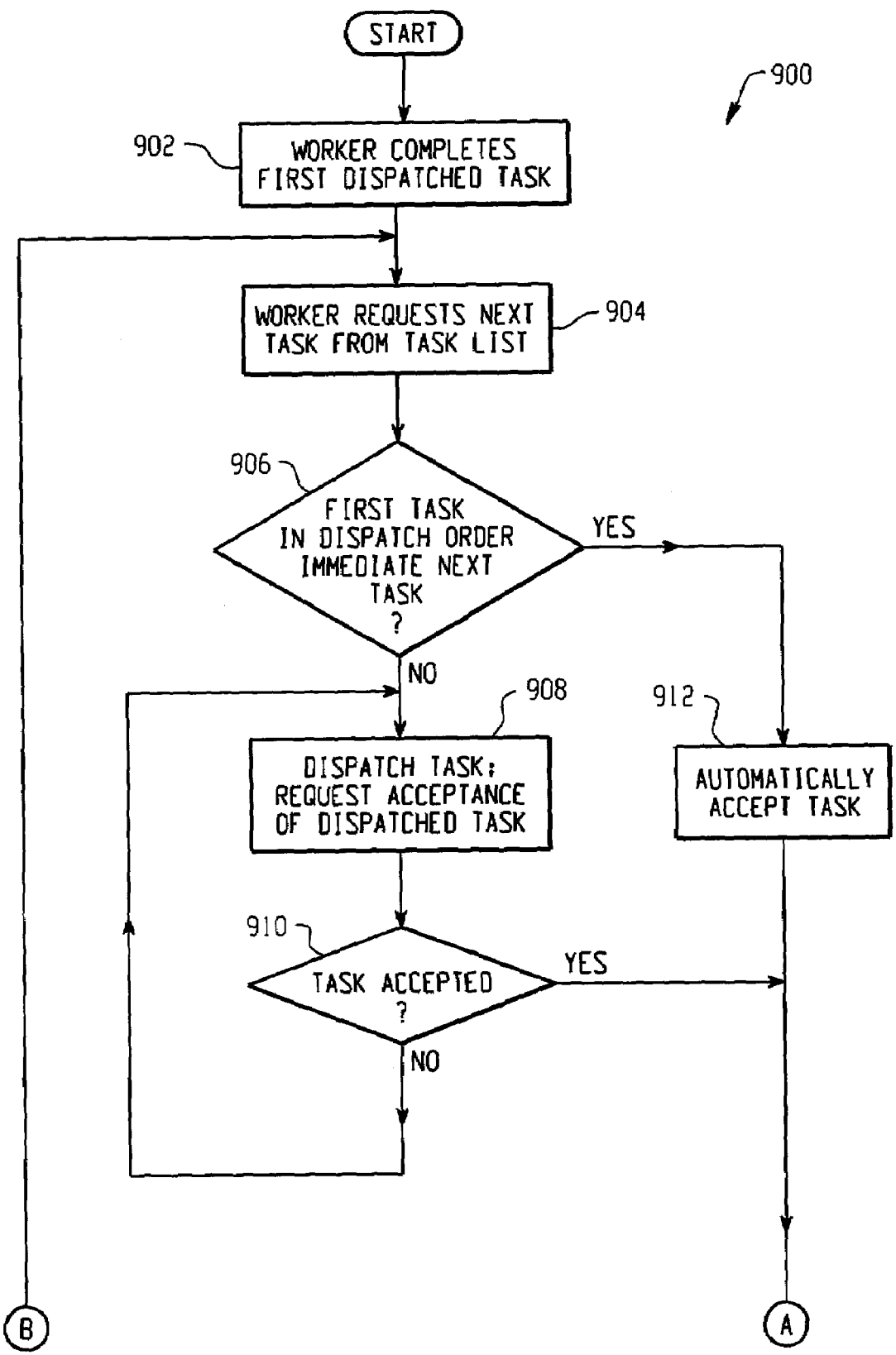
FIGS. 9A and 9B are a flow diagram illustrating a dispatch of a task from a task list.
Figure 9B:
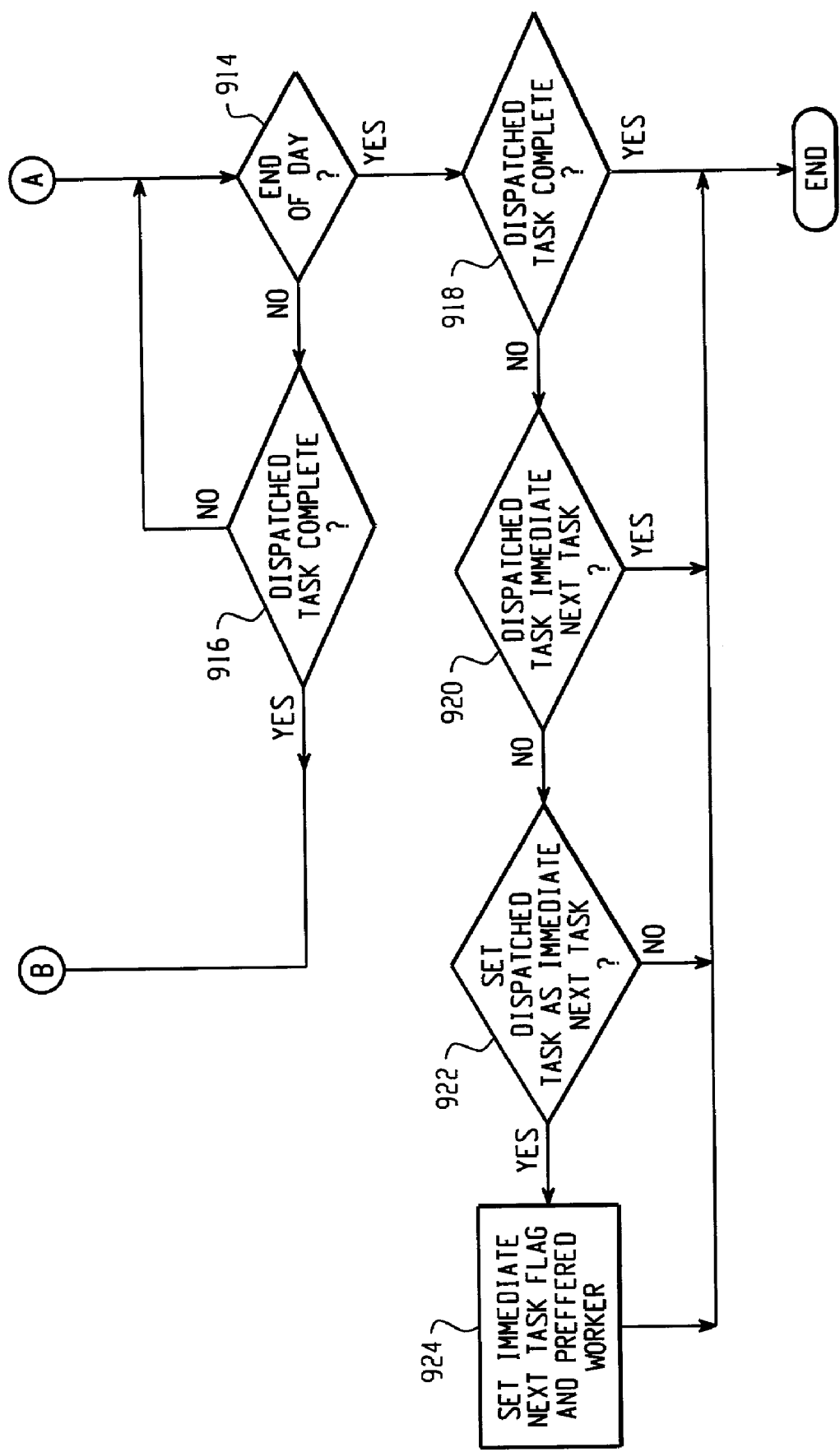

FIGS. 9A and 9B show a flow diagram 900 illustrating the dispatch of tasks 40 from a task list 360 to a worker 60. In step 902, the worker 60 completes the first task 40 dispatched during the worker's 60 shift. The worker 60 then contacts the automated dispatch computer 200 via the communication device 220 to request the next task 40 in the worker's 60 task list 360, as shown in step 904.

In step 906, the system 10 determines whether the first task 40 in the dispatch order is designated an immediate next task. If the first task 40 is not designated an immediate next task, the task 40 is dispatched and displayed on the input/output device 222 of the communication device 220, as shown in step 908. The input/output device 222 preferably displays a textual description of the task 40. The worker 60 may accept or reject the task 40, as shown in step 910. If the worker 60 accepts the task 40, the worker 60 begins working on the task 40. However, if the worker 60 rejects the task 40, then the next task 40 in the dispatch order of the worker's 60 corresponding task list 360 is dispatched in step 908. This process continues until the worker 60 accepts the dispatched task 40.

However, if the dispatched task 40 is designated an immediate next task, it is automatically accepted in step 912. The worker 60 cannot reject the immediate next task 40.

Once accepted, the worker 60 may continue to work on the dispatched task 40 until it is completed or until the end of the workday. If the end of day event 914 does not occur, the system 10 determines if the dispatched task 40 is completed, as shown in step 916. If the dispatched task 40 is completed, then the worker 60 may request another task in step 904. Steps 906, 908, 910, and 912 are then repeated as described above.

However, if the end of day event occurs in step 914, the system 10 determines if the worker 60 has completed the dispatched task 40 in step 918. If the dispatched task 40 is complete, no further action is taken.

However, if the dispatched task 40 is incomplete, the system 10 determines if the dispatched task 40 is designated an immediate next task, as shown in step 920. If the task 40 is designated an immediate next task, no further action is necessary, as the worker's 60 corresponding task list 360 will be loaded the next work day with the immediate next task 40 first in the dispatch order.

If the incomplete dispatched task 40 is not designated an immediate next task, the system 10 determines whether the incomplete dispatched task 40 will be designated as an immediate next task for the worker in step 922. This determination can be made by the worker 60, by the service provider, or be automatically determined by the system 10. If the incomplete dispatched task 40 is not designated an immediate next task, no further action is necessary. However, if the incomplete dispatched task 40 is designated an immediate next task, the immediate next task flag field 242 and the preferred worker 252 for the task 40 is set in step 924. Accordingly, the worker's 60 corresponding task list 360 will be loaded the next workday with the immediate next task 40 first in the dispatch order.

While the process of FIGS. 9A and 9B shows an automatic acceptance of a dispatched immediate next task 40, another embodiment of the invention does not include automatic acceptance of the immediate next task 40. Rather, the immediate next task 40 is conspicuously displayed on the input/output device 222 of the communication device 220 to provide the worker 60 indicia of the immediate next task status. The immediate next task 40 may be conspicuously displayed by color-coding a textual description of the task, or by issuing a text note that the task 40 is an immediate next task, or issuing an audible alarm, or by other means. Thus, the worker 60 is made aware that the task 40 is designated an immediate next task, and may then reject or accept the task 40.

In another embodiment of the invention, an immediate next task 40 is dispatched immediately. The system 10 may not dispatch a task 40 from a task list 360 until a specified time. For example, the system 10 determines the worker's 60 lunch hour from the schedule field 266. The system 10 will set the estimated start time of the task 40 to a time after the worker's 60 lunch hour, and will not dispatch the task 40 during a worker's 60 lunch hour. Illustratively, this specified time is the start time stored in the start time field 248 of the task record 140. However, if the task 40 is an immediate next task 40, it will be dispatched regardless of the estimate start time and is thus available for dispatch immediately.

In yet another embodiment, a worker 60 may not reject a task 40. However, the worker 60 may return the task 40 prior to its completion. A task 40 may be returned because a worker 60 does not have tools or equipment on hand to complete the task 40. Upon returning the task 40, another task 40 is dispatched to the worker 60. A task 40 may also be returned because the end of the worker's 60 shift may be approaching. Of course, a task 40 may also be returned for other reasons. The reason for returning a task 40 may be specified by the worker 60 when the worker returns the task 40.

However, if the task is an immediate next task 40, the worker 60 is precluded from returning a task 40 until it is completed. Thus, if the worker 60 does not have tools or equipment on hand to complete an immediate next task 40, the worker 60 must then obtain the tools or equipment and complete the immediate next task 40. Likewise, a worker 60 may not be able to return the task 40 because the end of the worker's 60 shift is approaching.

Figure 10:
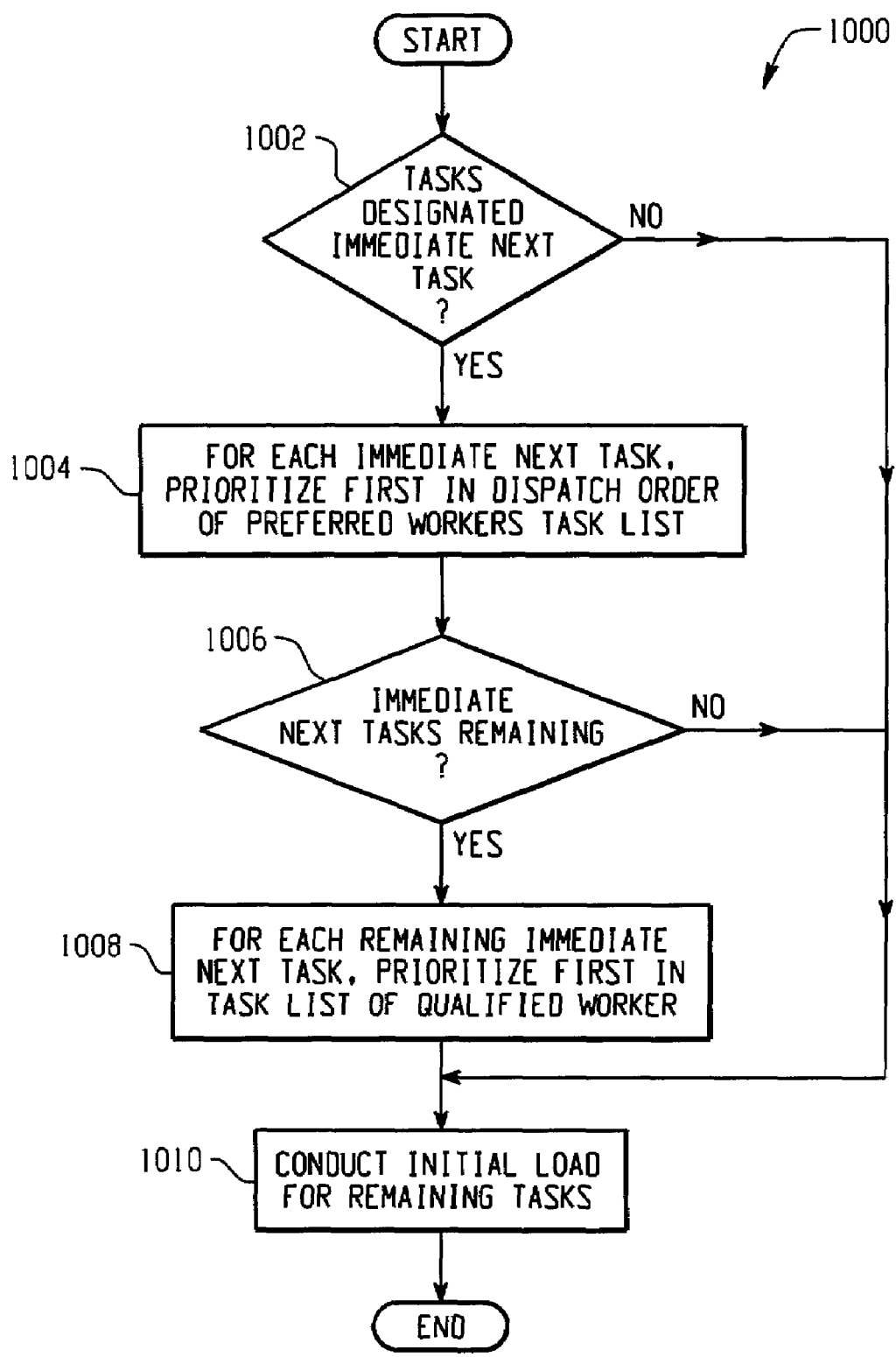
FIG. 10 is a flow diagram illustrating the initial load of the task lists.

FIG. 10 provides a flow diagram 1000 illustrating an initial load of the task lists 60 subject to an immediate next task designation. During an initial load, the immediate next task flag field 242 for each task 40 is checked to determine if any of the tasks 40 have been designated immediate next tasks, as shown in step 1002. If no tasks have been designated as immediate next tasks, the system conducts an initial load as shown in step 1010. The initial load creates the task lists 360 for the workers 60.

However, if one or more tasks 40 have been designated as immediate next tasks, then for each immediate next task 40 the preferred worker field 252 is checked to identify the preferred worker 60. If the schedule field 266 indicates that the preferred worker 60 will be present during the work day, the immediate next task 40 is assigned to the preferred worker 60 and prioritized first in the dispatch order of the task list 360 associated with the preferred worker 60, as shown in step 1004.

As a preferred worker 60 may be absent due to vacation, illness, etc., immediate next task tasks 40 may remain after step 1004. Thus, in step 1006, the system 10 determines if any immediate next task 40 have not been assigned to a preferred worker 60 due to the preferred worker being unavailable. If all immediate next task tasks 40 have been assigned, the system 10 conducts an initial load for all remaining tasks 40, as shown in step 1010.

However, if one or more immediate next tasks 40 remain unassigned, then the system 10 determines qualified workers 60 to respond to each remaining immediate next task 40. The system 10 determines whether a worker 60 is qualified to respond to the task 40 by comparing the task parameters 142 to the worker parameters 162 for each identified worker. The remaining immediate next tasks 40 are then assigned to the workers 60 and prioritized first in the dispatch order of the task lists 360 associated with the workers 60, as shown in step 1008. The system then conducts an initial load for all remaining tasks 40, as shown in step 1010.

In another embodiment, immediate next tasks 40 may only be assigned to a preferred worker 60. Thus, the immediate next tasks 40 are assigned only when the preferred worker 60 is available.

Figure 11:
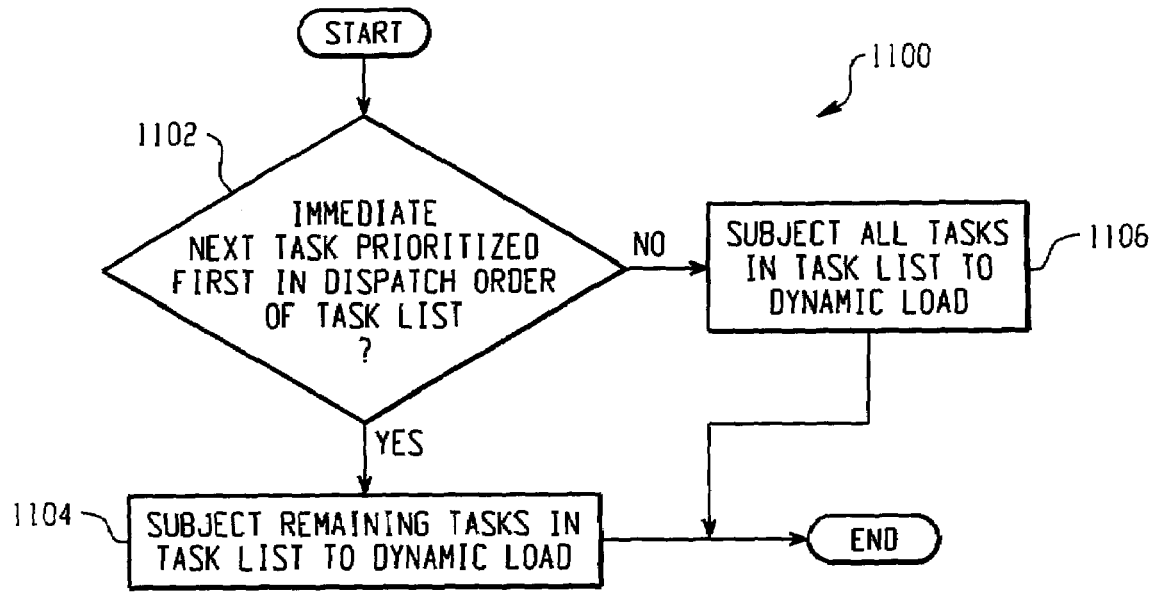
FIG. 11 is a flow diagram illustrating the dynamic load of the task lists.

FIG. 11 provides a flow diagram 1100 describing the dynamic load of a task list 360 subject to an immediate next task designation. During each dynamic load, the system 10 determines for each task list 360 whether an immediate next task 40 is prioritized first in the dispatch order for that task list 360, as shown in step 1102. If an immediate next task 40 is prioritized first in the dispatch order for a task list 360, only the remaining tasks 40 in the task list 360 are subject to the dynamic load, as shown in step 1104. If an immediate next task 40 is not prioritized first in the dispatch order for a task list 360, all tasks 40 on the task list 360 are subject to the dynamic load, as shown in step 1106.

The management module 120 preferably calculates an optimal or near-optimal distribution of the tasks 40 among the workers 60. However, because an immediate next task 40 is not subject to the dynamic load, the remaining tasks 40 in a particular task list 360 may be subjected to a dynamic load based on the task parameters 142 of the immediate next task to obtain an optimal or near-optimal distribution of the tasks 40 among the workers 60. An example of subjecting remaining tasks 40 in a particular task list 360 to a dynamic load based on the task parameters 142 of the immediate next task 40 is shown with reference to FIGS. 12 and 13.

Figure 12:
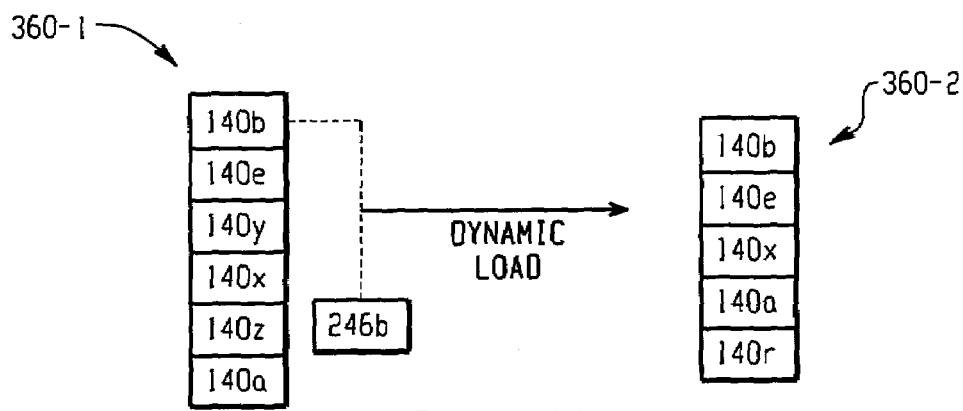
FIG. 12 illustrates a task list before and after a dynamic load.

FIG. 12 shows a task list 360 subjected to a dynamic load. Task list 360-1 represents the task list 360 before the dynamic load, and task list 360-2 represents the task list 360 after the dynamic load. The task list 360 does not include an immediate next task 40. Illustratively, the dynamic load distributes tasks 40 to a worker 60 according to minimal travel time from a currently dispatched task 40 to the next task 40 to be dispatched. Thus, during the dynamic load, the management module 120 determines the current location of the worker 60 through either the worker location field 268 or the task location field 246b of task record 140b corresponding to a currently dispatched task 40b. The management module 120 then dynamically loads the task list 360-2 based on the task location field 246b of the dispatched task 40b.

Figure 13:
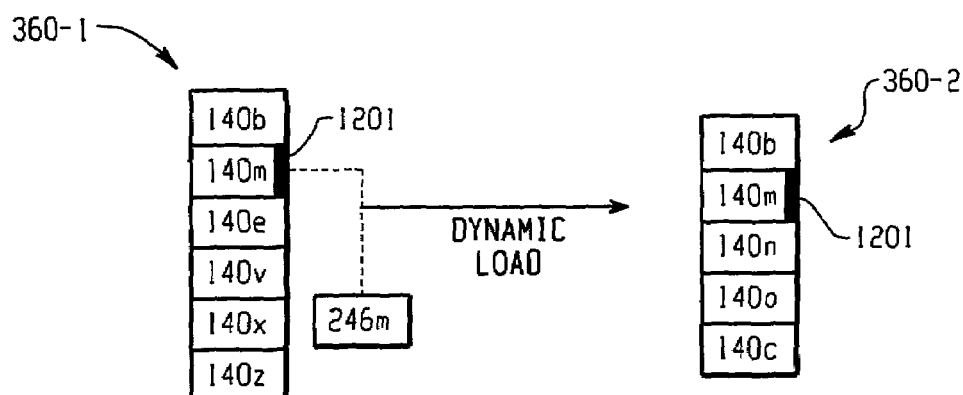
FIG. 13 illustrates a task list before and after a dynamic load subject to an immediate next task.

FIG. 13 is similar to FIG. 12, except in this example the task list 360 includes an immediate next task record 140m as indicated by a shaded bar 1201. The immediate next task record 140m corresponds to an immediate next task 40m that has been assigned to the worker 60 associated with the task list 360. Illustratively, the immediate next task 40m is at a distant location from the currently dispatched task 40b. Furthermore, because the task 40m is designated an immediate next task, it will be the next task 40 dispatched to the worker 60. Accordingly, based on the task location field 246m of the immediate next task record 140m, the dynamic load may assign to the worker 60 additional tasks 40n, 40o and 40c located near the immediate next task 40. Thus, once the worker 60 completes the immediate next task 40m, the task list 360-2 includes tasks 40 that are optimally or near-optimally distributed to the worker 60.

Alternatively, the management module 120 may ignore the task parameters of the immediate next task 40 when conducting a dynamic load, and thus create a task list 360 in which the dispatch order and remaining tasks 40 independent of the immediate next task.

In another embodiment, tasks 40 may be specified as locked or unlocked. An unlocked task 40 may be removed from a worker's 60 task list during the dynamic load, while a locked task 40 may not be removed from a worker's 60 task list 360 during a dynamic load. However, the locked task 40 may be changed in the dispatch order during the dynamic load. Thus, an immediate next task 40 will be first in the dispatch order of the task list 40, regardless of whether the remaining tasks 40 are locked or unlocked.

The embodiments described herein are examples of structures, systems or methods having elements corresponding to the elements of the invention recited in the claims. This written description may enable those of ordinary skill in the art to make and use embodiments having alternative elements that likewise correspond to the elements of the invention received in the claims. The intended scope of the invention thus includes other structures, systems or methods that do not differ from the literal language of the claims, and further includes other structures, systems or methods with insubstantial differences from the literal language of the claims.

What is claimed is:

1. A task management system for receiving and assigning a plurality of tasks to a plurality of workers, comprising:
 an electronic database for storing task records and worker records, each task record corresponding to a task and including task parameters, and each worker record corresponding to a worker and including worker parameters;
 a computer processor executing a management module, wherein the management module is operable to
  access the electronic database and compare the task records to the worker records and for each worker create a set of assigned tasks in a task list for each worker prioritized according to a corresponding dispatch order,
  specify which tasks of the set of assigned tasks in the task list are locked tasks and which tasks are unlocked tasks, wherein an unlocked task is subject to removal from a worker's task list during a dynamic load while a locked task is subject to being changed in the dispatch order but not be removed from the worker's task list during the dynamic load,
  when a number of tasks received by the task management system exceeds a predetermined threshold value, conduct the dynamic load of the tasks in the task lists for each worker,
  receive an immediate next task request for a requested task and a requested worker and, if no other task is designated an immediate next task for the requested worker, designate the requested task as an immediate next task for the requested worker and prioritize the immediate next task first in the corresponding dispatch order ahead of the set of assigned tasks in the task list for the requested worker, wherein the immediate next task is not part of the task list, is not subject to the dynamic load and cannot be rejected by the requested worker,
  dispatch the immediate next task and the set of assigned tasks in the task list to the requested worker based on the corresponding dispatch order,
  identify an alternate worker to be assigned the requested immediate next task if the management module cannot assign the immediate next task to the requested worker because the requested worker is unavailable,
  when the immediate next task cannot be assigned to the alternate worker because the alternate worker is already assigned an immediate next task then re-categorizing the unassigned immediate next task as a new task and prioritizing the new task as a first task in the task list for the alternate worker;
  when the worker is unable to perform the first task in the corresponding dispatch order, return the first task to the electronic database prior to completion if the first task is not an immediate first task;
  when the first task is assigned as an immediate first task, the worker is precluded from returning the immediate first task to the electronic database; and
 a plurality of worker communication devices, each worker communication device comprising an input/output device and operable to communicate with the management module, receive a dispatched task from the management module, display the dispatched task to the worker, receive a reply indicating one of acceptance, rejection and return of the dispatched task, and send the reply to the management module to indicate whether the dispatched task has been accepted, rejected or returned, and further operable to automatically accept the dispatched task if the dispatched task is an immediate next task.

2. The system of claim 1, wherein the management module is further operable to assign the immediate next task to the requested worker if the immediate next task is not assigned to the requested worker.

3. The system of claim 2, wherein the management module is further operable to reassign the immediate next task from the requested worker to another worker.

4. The system of claim 3, wherein the management module is further operable to remove the immediate next task designation as a result of the reassignment.

5. The system of claim 2, wherein the management module is further operable to periodically update the set of assigned tasks to the requested worker and the corresponding dispatch order, and prioritize the immediate next task assigned to the requested worker first in the corresponding dispatch order after the update.

6. The system of claim 5, wherein the set of assigned tasks to the requested worker and the corresponding dispatch order are based on the task parameters of the immediate next task.

7. The system of claim 6, wherein the task parameters include a task location, and wherein the set of assigned tasks to the requested worker and the corresponding dispatch order are based on an estimated travel time from the immediate next task.

8. The system of claim 5, wherein the set of assigned tasks to the requested worker and the corresponding dispatch order are independent of the task parameters of the immediate next task.

9. The system of claim 1, wherein the worker parameters include a schedule parameter indicating a worker's schedule, and wherein the management module is operable to designate a dispatched task as an immediate next task for the worker if the worker does not complete the dispatched task during the worker's schedule.

10. The system of claim 1, wherein the worker parameters include a schedule parameter indicating a worker's schedule, and wherein the management module is operable to designate only one immediate next task to the worker during the worker's schedule.

11. The system of claim 1, wherein the worker parameters include a schedule parameter indicating a worker's schedule, the worker's schedule having a start time, and the task parameters include a preferred worker field indicating a preferred worker, and the management module is further operable to assign immediate next tasks to preferred workers and prioritize the immediate next tasks first in the corresponding dispatch orders of the sets of assigned tasks to the preferred workers prior to the start time.

12. The system of claim 1, wherein the corresponding dispatch order includes dispatch times indicating when tasks in the set of assigned tasks are available for dispatch, and wherein the immediate next task is immediately available for dispatch.

13. The system of claim 1, wherein the indicia of an immediate next task is color coded text.

14. The system of claim 1, wherein the indicia of an immediate next task is an audible alarm.

15. The system of claim 1, wherein the immediate next task is associated with a preferred worker, and the management module is farther operable to assign the immediate next task to the preferred worker and prioritize the immediate next task first in the corresponding dispatch order of the set of assigned tasks to the preferred worker.

16. The system of claim 15, wherein the immediate next task may only be assigned to the preferred worker.

17. A computer implemented method of assigning a plurality of tasks to a plurality of workers, the method comprising the steps of:
storing in a database task parameters for each task;
storing in the database worker parameters for each worker;
comparing the task parameters to the worker parameters to create a task list containing a set of assigned tasks to each worker;
specifying which tasks of the set of assigned tasks are locked tasks and which are unlocked tasks, wherein an unlocked task is subject to removal from the worker's task list during a dynamic load, while an locked task is subject to being changed in the dispatch order but not be removed from the worker's task list during the dynamic load;
determining a corresponding dispatch order for each of the sets of assigned tasks;
receiving an immediate next task request for a task, wherein the immediate next task is not part of the task list, is not subject to a dynamic load and cannot be rejected by the worker;
designating the task as the immediate next task for a worker if another task is not designated an immediate next task for the worker;
placing the immediate next task first in the corresponding dispatch order;
when a number of tasks received by the task management system exceeds a predetermined threshold value, conducting the dynamic load wherein immediate next tasks are maintained first in the corresponding dispatch order and all other tasks are subject to the dynamic load;
dispatching the tasks to the worker based on the corresponding dispatch order; receiving a dispatched task at a communication device associated with the worker;
automatically accepting the dispatched task at the communication device when the task is an immediate next task;
providing the worker at the communication device with an option to accept, reject and return the dispatched task if the dispatched task is not an immediate next task; and
determining alternate workers to be designated the task as an immediate next task if another task is designated an immediate next task for the worker.

18. The method of claim 17, further comprising the step of assigning the immediate next task to the worker if the immediate next task is not assigned to the worker.

19. The method of claim 18, further comprising the step of specifying the worker as a preferred worker for the immediate next task.

20. The method of claim 19, further comprising the steps of:
determining a start time of a schedule for the preferred worker; and prior to the start time, assigning the immediate next task to the preferred worker.

21. The method of claim 18, further comprising the steps of:
periodically updating the set of assigned tasks to the worker and the corresponding dispatch order; and
maintaining the immediate next task assigned to the worker first in the corresponding dispatch order during the periodically updating step.

22. The method of claim 18, wherein the step of determining a corresponding dispatch order for each of the sets of assigned tasks comprises the steps of:
determining whether an immediate next task is in the set of assigned tasks; and if an immediate next task is in the set of assigned tasks, basing the corresponding dispatch order on the immediate next task.

23. The method of claim 18, wherein the step of determining a corresponding dispatch order for each of the sets of assigned tasks comprises the steps of:
determining whether an immediate next task is in the set of assigned tasks; and
when an immediate next task is in the set of assigned tasks, determining the corresponding dispatch order independent of the immediate next task.

24. The method of claim 18, further comprising the steps of:
determining the worker's schedule from the worker parameters; and
allowing the assignment of only one immediate next task to the worker during the worker's schedule.

25. The method of claim 18, further comprising the steps of:
reassigning the immediate next task from the worker to another worker; and
removing the immediate next task designation from the task as a result of the reassignment.

26. The method of claim 18, further comprising the steps of:
reassigning the immediate next task from the worker to another worker; and
maintaining the immediate next task designation during the reassignment.

27. The method of claim 17, further comprising the steps of:
determining the worker's schedule from the worker parameters; and
designating a dispatched task as an immediate next task for the worker if the dispatched task is not completed during the worker's schedule.

28. The method of claim 17, further comprising the steps of:
determining a dispatch time for each assigned task;
making available for dispatch an assigned task after the dispatch time; and
making available for dispatch an immediate next task immediately.

29. The method of claim 17, further comprising the steps of:
receiving a dispatched task at a communication device associated with the worker;
providing indicia of an immediate next task if the dispatched task is an immediate next task; and
prompting the worker at the communication device to accept or reject the dispatched task.

30. A task management system for assigning a plurality of tasks to a plurality of workers, comprising:
an electronic database for storing task records and worker records, each task record corresponding to a task and including task parameters, and each worker record corresponding to a worker and including worker parameters; and
a computer processor executing a management module, wherein the management module is operable to
access the electronic database and compare the task records to the worker records and for each worker create a set of assigned tasks prioritized according to a corresponding dispatch order, and dispatch the set of assigned tasks to the worker based on the corresponding dispatch order,
specify which tasks of the set of assigned tasks are locked tasks and which are unlocked tasks, wherein an unlocked task is subject to removal from the worker's task list during a dynamic load, while an locked task is subject to being changed in the dispatch order but not be removed from the worker's task list during the dynamic load, when the time since the last dynamic load exceeds a predetermined threshold value, conduct the dynamic load of the new tasks wherein existing immediate tasks are maintained first in the corresponding dispatch order and all other tasks are subject to the dynamic load;

when the worker is unable to perform a first task in the corresponding dispatch order, return the task to the electronic database prior to completion if the task is not an immediate first task, receive an immediate next task request for a requested task and a requested worker, wherein the immediate next task is not part of the task list, is not subject to the dynamic load and cannot be rejected by the worker, when no other task is designated as an immediate next task for the requested worker, designate the requested task as an immediate next task for the requested worker and set the corresponding dispatch order of the set of assigned tasks to the requested worker subordinate to dispatch of the immediate next task, when the requested worker is able to accomplish the immediate next task within a workday, designate another immediate next task for the requested worker, identify alternate workers to be assigned the requested task from the immediate next task request if the management module cannot designate the requested task as an immediate next task to the requested worker; and a plurality of worker communication devices, each worker communication device comprising an input/output device and operable to communicate with the management module, receive a dispatched task from the management module, display the dispatched task to the worker, receive a reply indicating one of acceptance, rejection and return of the dispatched task, and send the reply to the management module to indicate whether the dispatched task has been accepted, rejected or returned, and further operable to automatically accept the dispatched task if the dispatched task is an immediate next task.

31. The system of claim 30, wherein the immediate next task is associated with a preferred worker, and the management module is further operable to designate the immediate next task to the preferred worker.

32. The system of claim 31, wherein the immediate next task may only be designated to the preferred worker.

33. The system of claim 30, wherein the management module is further operable to periodically update the set of assigned tasks to the requested worker and the corresponding dispatch order, and wherein the corresponding dispatch order remains subordinate to the dispatch of the immediate next task after the update.

34. The system of claim 30, wherein the set of assigned tasks to the requested worker and the corresponding dispatch order are based on the task parameters of the immediate next task.

35. The system of claim 30, wherein the worker parameters include a schedule parameter indicating a worker's schedule, and wherein the management module is operable to designate only one immediate next task to the worker during the worker's schedule.

36. The system of claim 30, wherein the management module is further operable to designate the immediate next task from the requested worker to another worker.

37. The system of claim 30, wherein the worker parameters include a schedule parameter indicating a worker's schedule, and wherein the management module is operable to designate a dispatched task as an immediate next task for the worker if the worker does not complete the dispatched task during the worker's schedule.

38. A task management system for assigning a plurality of tasks to a plurality of workers, comprising:

a electronic database for storing task records and worker records, each task record corresponding to a task and including task parameters, and each worker record corresponding to a worker and including worker parameters;

a computer processor executing a management module, wherein the management module is operable to access the electronic database and compare the task records to the worker records to create a set of assigned tasks for each worker, prioritize the sets of assigned tasks according to corresponding dispatch orders, dispatch the sets of assigned tasks to the workers based on the corresponding dispatch order, specify which tasks of the set of assigned tasks are locked tasks and which are unlocked tasks, wherein an unlocked task is subject to removal from the worker's task list during a dynamic load, while an locked task is subject to being changed in the dispatch order but not be removed from the worker's task list during the dynamic load, when a number of tasks received by the task management system exceeds a predetermined threshold value, conduct the dynamic load of the tasks wherein the immediate task is maintained first in the corresponding dispatch order and all other tasks are subject to the dynamic load, the dynamic load being based on one or more task parameters of the immediate next task of the worker, and receive an immediate next task request for a task, wherein the immediate next task is not part of the task list, is not subject to a dynamic load and cannot be rejected by the worker, identify workers qualified to be designated to the immediate next task, identify a worker to the immediate next and prioritize the immediate next task first in the corresponding dispatch order of the set of assigned tasks to the identified worker;

identify alternate workers to be designated the requested task from the immediate next task request if the management module cannot designate the requested task as an immediate next task to the identified worker, when the worker is unable to perform a first task in the corresponding dispatch order, return the task to the electronic database prior to completion if the task is not an immediate first task, and a plurality of worker communication devices, each worker communication device comprising an input/output device and operable to communicate with the management module, receive a dispatched task from the management module, display the dispatched task to the worker, receive a reply indicating one of an acceptance, rejection and return of the dispatched task, and send the reply to the management module to indicate whether the dispatched task has been accepted, rejected or returned, and further operable to automatically accept the dispatched task if the dispatched task is an immediate next task.

39. The system of claim 38, wherein the management module is further operable to assign the immediate next task to the identified worker if the immediate next task is not assigned to the identified worker.

40. The system of claim 39, wherein the worker parameters include a schedule parameter indicating a worker's schedule, and wherein the management module is further operable to assign only one immediate next task to a worker during the worker's schedule.

41. The system of claim 39, wherein the management module is further operable to reassign the immediate next task from the identified worker to another worker.

42. The system of claim 41, wherein the management module is further operable to remove the immediate next task designation as a result of the reassignment.

43. The system of claim 39, wherein the management module is further operable to periodically update the set of assigned tasks to the identified worker and the corresponding dispatch order, and prioritize the immediate next task assigned to the identified worker first in the corresponding dispatch order after the update.

44. The system of claim 43, wherein the set of assigned tasks to the identified worker and the corresponding dispatch order are independent of the task parameters of the immediate next task.

45. The system of claim 38, wherein the set of assigned tasks to the identified worker and the corresponding dispatch order are based on the task parameters of the immediate next task.

46. The system of claim 45, wherein the task parameters include a task location, and wherein the set of assigned tasks to the identified worker and the corresponding dispatch order are based on an estimated travel time from the immediate next task.

47. The system of claim 38, wherein the corresponding dispatch orders includes dispatch times indicating when tasks in the sets of assigned tasks are available for dispatch, and wherein the immediate next task is immediately available for dispatch.

48. The system of claim 38, wherein the worker parameters include a schedule parameter indicating a worker's schedule, and wherein the management module is operable to designate a dispatched task as an immediate next task for the worker if the worker does not complete the dispatched task during the worker's schedule.

49. The system of claim 38, wherein the indicia of an immediate next task is color coded text.

50. The system of claim 38, wherein the indicia of an immediate next task is an audible alarm.

51. A computer readable media storing computer software executable on a computing device, the computer software comprising program code for the computer performing the method according to claim 17.

* * * * *